Oct. 9, 1956  E. J. WAGNER  2,766,392
REVERSIBLE SHADED POLE MOTOR ASSEMBLY AND METHOD
Filed March 18, 1954  2 Sheets-Sheet 1
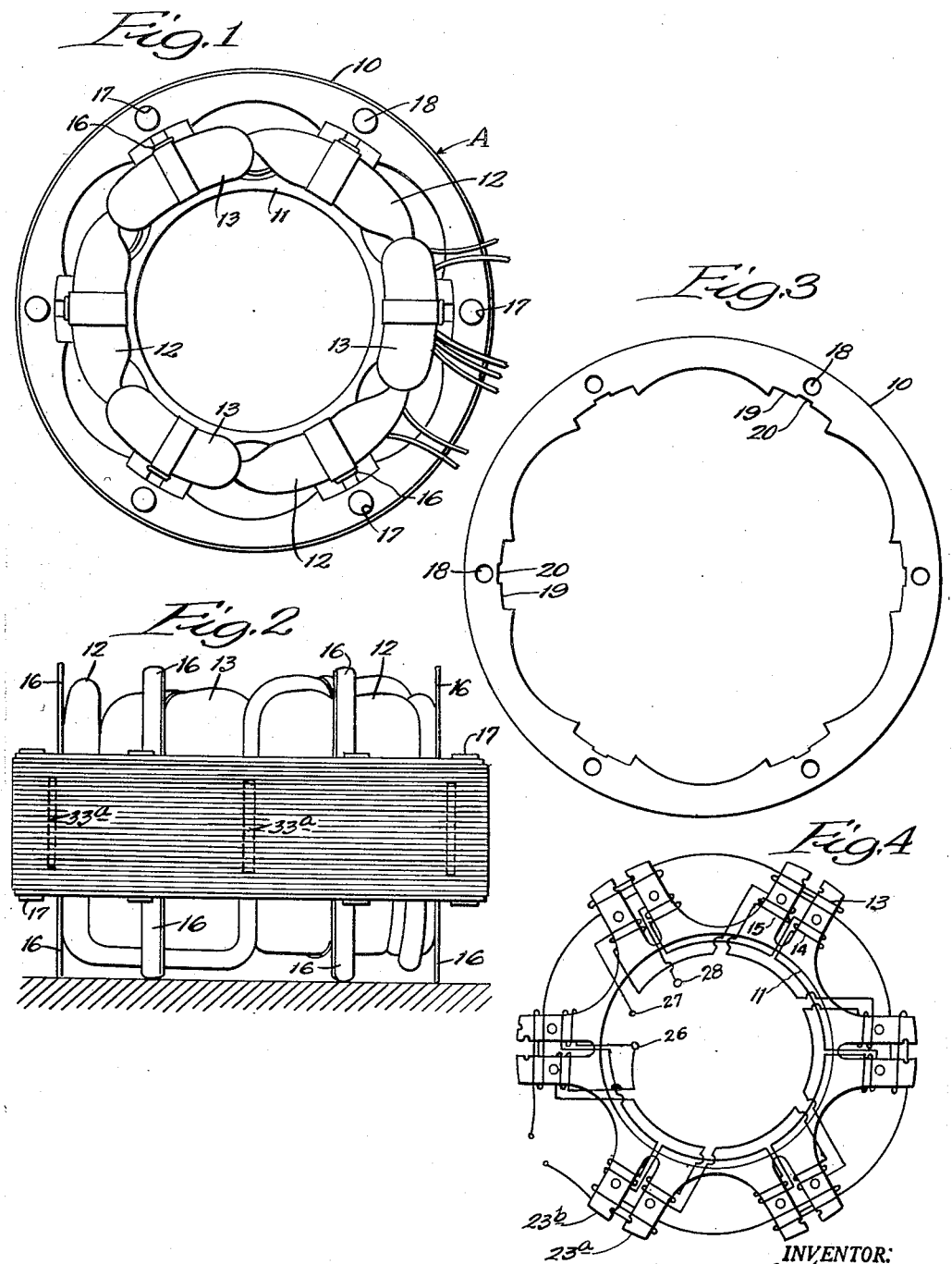
INVENTOR:
Edward J. Wagner,
BY
Watson D. Harbaugh
ATTORNEY Oct. 9, 1956 E. J. WAGNER 2,766,392
REVERSIBLE SHADED POLE MOTOR ASSEMBLY AND METHOD
Filed March 18, 1954 2 Sheets-Sheet 2
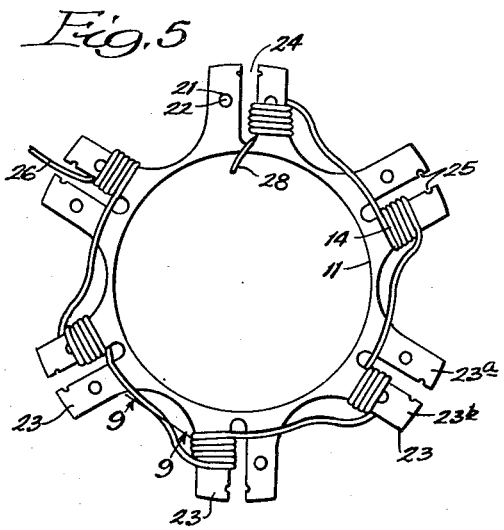
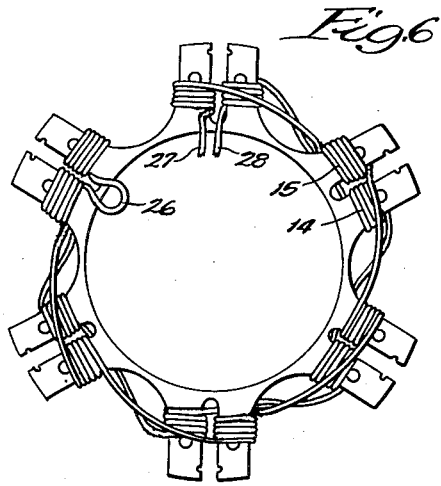
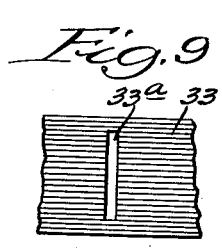
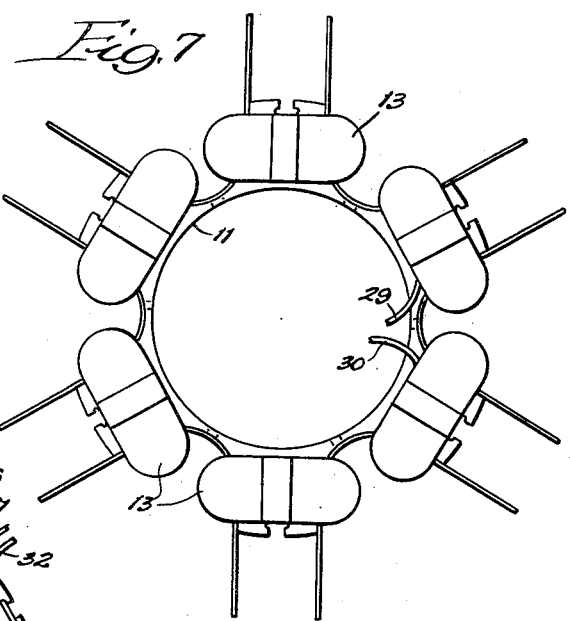
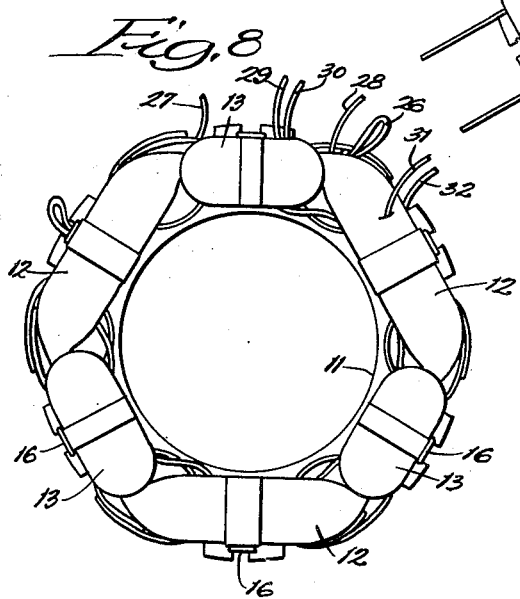
INVENTOR:
Edward J. Wagner,
BY
Watson D. Harbaugh
ATTORNEY

United States Patent Office 2,766,392
Patented Oct. 9, 1956

2,766,392

REVERSIBLE SHADED POLE MOTOR ASSEMBLY AND METHOD

Edward J. Wagner, Berwyn, Ill., assignor to Dormeyer Corporation, Chicago, Ill., a corporation of Illinois Application March 18, 1954, Serial No. 416,999

11 Claims. (Cl. 310—172)

This invention relates to electric motors, and more particularly to an induction motor assembly and method of constructing the same. Even more especially the invention relates to a stator assembly and method of assembling the same for shaded pole motors.

Shaded pole induction motors are in wide usage today, especially where economical fractional horsepower motors are required. For example, these motors are used to a great extent in small fans wherein a relatively small input is required. While shaded pole motors are well known in the art, it may be stated in order to provide some background for the invention that in single phase motors it is necessary to provide a starting torque, and this is accomplished by including as part of the stator assembly an auxiliary winding which is oriented at an electrical angle of about 30° to 60° from the main stator windings. Such auxiliary windings are called shading coils and the motors in which they are used are customarily referred to as shaded pole motors. If the motor is to be made reversible it is necessary to provide a shading coil on each side of the pole cores of the stator and to also provide means for selectively opening and closing each of the coil circuits.

The shading coil or coils usually consist of a turn or so of wire formed about a portion of a pole core and these coils may be short circuited at each turn or all of the coils about complementary pole sections may be connected in series and the entire coil structure shorted. It has been found that a shaded pole motor is much more efficient running under load when the individual pole pieces or cores are bridged together to provide a complete magnetic circuit so that the main flux path and the shaded pole flux path are effective at a greater angle with respect to each other at each pole. Therefore, those shaded pole motors in general use and which are most efficient have stator poles which are bridged or connected together to provide a complete magnetic circuit.

A problem has existed in the construction of shaded pole induction motors with respect to mounting the various stator windings upon the pole pieces. If all of the windings are formed about the poles it becomes a time-consuming and expensive task. On the other hand, if at least some of the stator windings are formed on winding machines and then placed about the pole pieces, difficulty often arises in properly holding the windings in place while the stator cores are assembled. That is to say, the stator core may be formed in two pieces, an outer core piece, and an inner core piece which provides the stator poles. After the windings are placed about the pole pieces of the inner core, the inner core is inserted into the outer core to form the completed stator assembly.

It is, accordingly, an object of this invention to provide an induction motor wherein the disadvantages of prior art motors such as discussed above will be overcome. Another object of the invention is to provide a stator assembly for a shaded pole motor and a method for constructing and assembling the stator. Still another object is to provide a stator assembly and method of constructing the same for shaded pole motors wherein an inner core is equipped with outwardly-extending pole pieces adapted to receive the stator windings therein and wherein means are provided for securing the windings in place upon the pole pieces while the inner core is inserted into an outer core. Yet another object is to provide means for holding the windings in place upon the core pieces as described above and wherein the means is operative to support the stator in a manner protecting the windings while the stator is being constructed.

Another object of the invention is to provide a construction wherein field reluctance air gaps are or can be spaced unevenly enough around the rotor that synchronous hum and the "pulsing" or harmonic reaction between the rotor and rotating field that induces it are greatly reduced.

A further object of the invention is to provide an inner stator core formed of a plurality of laminations and having outwardly-extending pole pieces adapted to receive windings thereon, means being provided to anchor the windings in place upon the pole pieces and at the same time prevent the laminated inner core from collapsing when the same is pressed into position within an outer core. Additional objects and advantages will appear as the specification proceeds.

An embodiment of the invention is illustrated in the accompanying drawings, in which—

Figure 1 is a top plan view of a stator assembly embodying my invention; Fig. 2 is a side view in elevation of the structure shown in Fig. 1; Fig. 3 is a top plan view of an outer stator or field core; Fig. 4 is a top plan view of an inner stator or field core and wherein the windings formed about the pole pieces are shown somewhat diagrammatically; Fig. 5 is a top plan view of an inner stator core showing shading coils wound about one half of the pole pieces and showing the first step in constructing the stator; Fig. 6 is a top plan view similar to that of Fig. 5 but showing the inner core after the second shading coils have been formed in place upon the pole pieces; Fig. 7 is a top plan view similar to those of Figs. 5 and 6 but showing the inner core after the main stator or field windings have been placed in position upon the pole pieces; Fig. 8 is a top plan view similar to that of Figs. 5 through 7 but showing the inner core after the addition of the skein windings to the pole pieces; and Fig. 9 is a broken sectional view taken on the line 9—9 of Fig. 5.

Reference will first be made to Figs. 1 and 2 wherein the entire stator assembly of a shaded pole motor is illustrated. The stator is designated generally with the letter A and comprises an outer stator or field core 10 and an inner stator core 11 having mounted thereon a plurality of skein windings 12, a plurality of main windings 13, and a plurality of shading coils or windings 14 and 15 (Fig. 6). A plurality of wedges or pins 16 are carried by the inner core 11 and serve to anchor the windings in place and serve also to support the windings above a table level, as is illustrated in Fig. 2, so that the chances of the windings being damaged during assembly of the stator are substantially minimized.

The outer core 10 may be formed from a plurality of blanks that are pressed or stamped from suitable core material. The individual outer core blanks are then stacked and are suitably insulated from each other and while in stacked condition are secured together by a plurality of eyelets 17 that extend through the openings 18 provided in the outer core blanks. The construction of such core pieces is well known in the art, and the core is laminated and simply comprises a plurality of blanks stacked and secured together in the conventional manner. It is believed therefore that a further description of the outer core is unnecessary for an adequate description and complete understanding of this invention. The outer stator core is cylindrical and is provided centrally with an arcuate opening therethrough that is substantially circular. It will be noted by referring to Fig. 3 that a plurality of channels 19 are formed about the inner periphery of the outer core 10 and, if desired, each of the channels 19 may have a recess 20 formed centrally therein. The channels 19 are adapted to receive the pole pieces therein provided by the inner core, as will be subsequently described.

The inner stator or field core 11 is seen best in Figs. 5 and 6. The inner core is also provided by a plurality of inner core blanks that may be stamped or pressed from suitable metal sheets and which have been stacked after being insulated from each other and secured together by rivets 21 that extend through the openings 22 provided about the blanks. The core 11 is equipped with a plurality of spaced-apart outwardly-extending pole cores or pole pieces 23 that are each bifurcated to provide legs 23a and 23b that are spaced apart by a longitudinally-extending slot 24. Adjacent the outer ends of the pole pieces 23 and extending laterally from the slots 24 are recesses 25 that are aligned with each other and which are adapted to receive the wedges 16 therein. The dimensions of the inner core 11 from pole tip to pole tip are such that the inner core can be pressed into the outer core 10 with the outer ends of the pole pieces 23 being received within the channels 19 provided by the outer core. The inner core is provided with an annular central opening therethrough which is adapted to receive the rotor of the motor.

In the method of constructing the stator, the outer core 10 is first provided in the form illustrated in Fig. 3 and the inner core 11 is then provided. The first step is to form the shading coils 14 about each of the legs 23b of the pole pieces. Preferably the individual coils 14 are connected in series as is seen in Fig. 5. Thereafter the shading coils 15 are formed about the legs 23a of the pole pieces to provide a coil assembly as is illustrated in Fig. 6. Preferably the individual coils on each of the legs 23a are connected in series and, if desired, the series coils 14 and 15 may be connected together to provide a common lead or connection 26, while the opposite ends of the separate coils 14 and 15 remain separated to provide the terminals or leads 27 and 28. The coils 14 on the legs of adjacent pole pieces are wound in opposite directions so that one coil is wound in a counterclockwise direction, the next in a clockwise direction, and so on. The shading coils 15 are similarly wound.

Thereafter the main windings 13 are placed about the pole pieces 23 as is seen best in Fig. 7. In the illustration given there are six spaced-apart pole pieces 23 and preferably each pole piece is equipped with a main coil or winding 13 so that six in all are provided. All of the separate coils of the main winding 13 are connected together in series and the ends thereof are brought out to form the terminals or leads 29 and 30. Preferably the main winding coils are formed on a coil forming machine and after their formation are slipped over the pole pieces 23.

The next step in the assembly is to provide the skein windings 12 and to place the same about alternate pole pieces 23. The positioning of the skein windings 12 is best seen in Fig. 8 and it is seen in this illustration that three separate coils forming the skein winding 12 are provided. Preferably the separate coils of the skein winding are connected together in series and the ends of the winding are brought out to provide the leads 31 and 32. The coils forming the skein winding may also be wound on a coil forming machine and after their formation placed about the core pieces 23 in the manner illustrated in Fig. 8. In the assembly, then, the shading coils are first placed upon the pole pieces, the main windings are then placed in position over the shading coils, and then the skein windings are placed over the main wind- ings, the wedge of the last pole is removed before the skein is placed in position.

The next step in the operation is to drive the wedges or pins 16 into position within the slots 25. The pins 16 are elongated and have a greater length than the longitudinal length or axis of the skein windings 12 which are the largest windings in the stator. The pins 16 are frictionally gripped within the recesses or wedge slots 25 and serve to anchor the windings in position upon the pole pieces. The length of the pins 16 relative to the winding carried by the pole pieces is best seen in Fig. 2 which illustrates the stator after assembly and supported upon the pins 16 which in turn are suported upon a table or bench, etc. The insulation is lapped over and anchored with friction tape.

After the pins or wedges 16 are all in place, one being provided for each of the pole pieces 23, the entire inner core 11 with all of the windings thereon is pressed into position within the outer core 11. In this operation the pole pieces 23 are aligned with the channels 19 and the frictional engagement between the walls of the channels and sides and ends of the pole pieces securely lock the inner and outer cores together. In this operation the pins 16, which are frictionally gripped by each of the laminations which together comprise the inner core, prevent the inner core from collapsing as it is pressed into position within the outer core. Thereafter the pins or wedges 16 support the stator windings above the surface of a work table, etc., to protect the same from damage. The wedges 16 may be left in position while the stator is equipped with a suitable motor casing, and remain in position and form a permanent part of the stator assembly.

The illustration presented in Fig. 4 shows in schematic form the position and character of the shading coils, main windings and skein windings upon the inner core 11.

It will be apparent that I have provided a novel stator assembly that is exceptionally useful in reversible shaded pole motor assemblies and that a novel method of constructing a motor stator is also provided. The invention permits ready construction of a stator assembly for shaded pole motors and the assembly may be accomplished rapidly and is relatively inexpensive. At the same time, all of the advantages of prior shaded pole motors are retained and the particular advantages ascribed to the bridging or physical connection of the separate pole pieces of a stator are also achieved, for as is clear from Figs. 5 and 6 each of the pole pieces 23 is connected to the adjacent pole pieces by integral parts of the laminations. These bridging pieces for the sake of clarity are designated with the numeral 33 and it will be appreciated that a continuous magnetic circuit is provided about the interior of the inner core 11.

The individual coils about the legs 23b of the pole pieces and which together provide the shading coil 14 are adapted to provide starting torque to rotate the motor rotor in one direction when the leads 28 and 26 are connected together. Similarly, when the leads 27 and 26 are connected together the shading coil 15 is energized to provide the required torque to rotate the motor rotor in the opposite direction. Thus the two shading coils 14 and 15 provide a motor that is reversible. It will be apparent that suitable means may be provided to selectively connect the leads 26 and 27 together, or the leads 26 and 28 together, depending upon the direction of rotation that it is desired to provide.

It will be noted in Figs. 2 and 9 that the bridging pieces 33 are provided with gaps or slots 33a that furnish field reluctance air gaps. These slots are spaced apart by uneven distances about the inner core 11. That is, at least some of the slots 33a are not equally spaced between adjacent slots but all of the slots need not be so unevenly spaced from each other. The precise spacing is not critical and preferably the off-setting will be but a few degrees as shown in Fig. 7. I have found that the uneven spacing is extremely desirable for it substantially reduces synchronous hum and pulsing or harmonic reaction between the rotor and rotating field that induces it.

While in the foregoing specification an embodiment of the invention has been set out in considerable detail for purposes of illustration, it will be apparent to those skilled in the art that the details of the invention may be varied appreciably without departing from the spirit and principles of the invention.

I claim:

1. In a structure of the character described, an inner core equipped with a plurality of spaced-apart, outwardly-extending pole pieces, each of said pole pieces being provided with a slot therein having laterally-extending recesses adjacent the outer ends thereof, windings carried by said pole pieces, an elongated integral reinforcing wedge for each of said pole pieces and received within the recesses thereof at a right angle to the longitudinal axes of said pole pieces, and an outer core about said inner core.

2. The structure of claim 1 in which each of said wedges extends outwardly beyond the faces of said pole pieces and are frictionally gripped within said recesses.

3. The structure of claim 1 in which said inner and outer cores each comprise a plurality of laminations rigidly secured together.

4. The structure of claim 1 in which a plurality of windings are carried by said pole pieces, certain of the windings being about the pole pieces and other of the windings having turns within said slots.

5. In a stator assembly adapted for use in a shaded pole motor, an inner laminated core equipped with a plurality of spaced-apart, outwardly-extending pole pieces, said pole pieces being connected together adjacent the inner ends thereof, each of said pole pieces also being provided with a longitudinally-extending slot therein having laterally-extending recesses adjacent the outer end thereof, stator windings carried by said pole pieces, an elongated integral reinforcing wedge for each of said pole pieces and being received within the recesses thereof at a right angle to the longitudinal axes of said pole pieces and being frictionally gripped thereby, and an outer laminated core equipped with a plurality of spaced-apart channels alignable with said pole pieces and being adapted to receive the same therein, said outer core being positioned about said inner core with said pole pieces being received within said channels.

6. The structure of claim 5 wherein each of said slots provides a bifurcated pole piece having spaced-apart legs, each of said legs being adapted to have a shading coil formed thereabout.

7. In a stator assembly of the character described, an outer laminated core providing an enlarged central opening therethrough and equipped about the inner peripheral surface thereof with a plurality of spaced apart channels, an inner laminated core having a plurality of spaced-apart outwardly-extending pole pieces alignable with said channels and being received therein, each of said pole pieces being bifurcated and having a longitudinally-extending slot therein equipped adjacent the outer ends of the pole pieces with laterally-extending recesses, shading coils carried by said pole pieces and stator windings also carried by said pole pieces, and integral reinforcing wedges received within said recesses at a right angle to the longitudinal axes of said pole pieces and being frictionally gripped thereby.

8. In a method of constructing the stator assembly of an electric motor, the steps of providing an inner core having a plurality of spaced-apart, outwardly-extending pole pieces, providing windings about said pole pieces, locking integral elongated wedges to each of said pole pieces adjacent the outer ends thereof to confine said windings in position about said pole pieces, providing an outer core, and pressing said inner core into said outer core while said wedges are in position.

9. In a method of constructing the stator of a shaded pole motor, the steps of providing an outer laminated core equipped with a plurality of spaced-apart channels, providing an inner laminated core equipped with a plurality of outwardly-extending pole pieces alignable with said channels, said pole pieces having recesses thereon adjacent their outer ends, providing a plurality of windings about said pole pieces, inserting integral wedges within said recesses, aligning said pole pieces with said channels, and pressing said inner and outer cores together.

10. In a motor stator assembly, a stator core equipped with pole pieces, stator windings on said pole pieces, and bridging pieces between said pole pieces and providing therewith a substantially continuous magnetic circuit about said core, said bridging pieces being provided with slots therethrough, said slots being spaced apart and at least one slot being unevenly spaced between adjacent slots.

11. In a method of constructing a shaded pole motor, the steps of providing an outer laminated core equipped with a plurality of spaced-apart channels, providing an inner laminated core equipped with a plurality of outwardly-extending longitudinally bifurcated pole pieces adapted to key in said channels, said pole pieces having transverse recesses therein adjacent their outer ends, providing a plurality of windings about the legs of pole pieces, inserting unitary reinforcing wedges within said recesses at right angles to the longitudinal axes of said pole pieces with the extremities thereof extending beyond said pole pieces, aligning said pole pieces with said channels, pressing said inner core into said outer core while said wedges are in position, supporting said stator upon the lower extremities of said wedges and securing a suitable motor casing upon the stator.

References Cited in the file of this patent

UNITED STATES PATENTS

| Number | Name | Date |
|---|---|---|
| 888,456 | Barr | May 26, 1908 |
| 1,933,498 | Morrill | Oct. 31, 1933 |
| 1,969,981 | Janca | Aug. 14, 1934 |
| 1,978,100 | Buerke | Oct. 23, 1934 |
| 2,465,820 | Sparrow et al. | Mar. 29, 1949 |
| 2,590,255 | Le Tourneau | Mar. 25, 1952 |
| 2,607,816 | Ryder et al. | Apr. 19, 1952 |
| 2,615,944 | Carlson | Oct. 28, 1952 |

FOREIGN PATENTS

| Number | Country | Date |
|---|---|---|
| 410,064 | Great Britain | May 10, 1934 |